UNITED STATES PATENT OFFICE.

HEINRICH CARO, OF MANNHEIM, GRAND DUCHY OF BADEN, GERMANY.

IMPROVEMENT IN METHYL-ANILINE VIOLET COLORS.

Specification forming part of Letters Patent No. 204,797, dated June 11, 1878; application filed March 28, 1878.

*To all whom it may concern:*

Be it known that I, HEINRICH CARO, of Mannheim, in the Grand Duchy of Baden and Empire of Germany, have invented a new and useful Improvement in Dye-Stuffs and Coloring-Matters, which improvement is fully set forth in the following specification.

This invention relates to a dye-stuff or coloring-matter produced from methyl-violet by converting the same into an acid compound, so as to render the same capable of being employed in the process of dyeing and printing in the presence or with the aid of acid or acid mordants.

It is well known that most basic aniline coloring-matter, such as fuchsine and methyl-violet, require the employment of neutral dye-baths. The presence of a free acid, or of acid metallic compounds, produces the formation of acid salts, (from which the fiber is not able to extract the coloring-matter completely,) and from fabrics already dyed most of the coloring-matter is again removed by the action of acids. For this reason the employment of fuchsine or methyl-violet has been comparatively limited in the art of dyeing and printing, and, notwithstanding their superior qualities as coloring-matters, they have not been used as substitutes for the coloring-matters of the natural dye-woods, and for orseille, archil, or orchil, because they do not, like the latter, permit the formation of different tints by mixing them with acid coloring-matters, and in the presence of the acids and acid mordants commonly used in dyeing and printing.

By converting methyl-violet into its sulpho-acid, I have produced a new dye-stuff or coloring-matter, which dyes in the presence of strong acids, which is not changed by the same, and which can be employed simultaneously with dye-woods, phenol coloring-matters, orseille, indigo, carmine, nitro-acids, &c. Under the term "methyl-violet" I comprise methyl-purples, Paris violets, and Hoffman's violets, all of which terms designate the same article.

For the purpose of producing the sulpho-acid of methyl-violet, I proceed as follows: I take ten kilograms of methyl-violet which has been dried at 110° centigrade, and add thereto, little by little, forty kilograms of fuming sulphuric acid under constant agitation, while the temperature of the mixture must not be allowed to sink below 100° centigrade, nor to rise above 120° centigrade. A sample of the mass is supersaturated from time to time with an alkali, such as soda-lye, and if a clear yellowish solution is produced without a precipitate the conversion is completed. The thick fluid mass obtained by this conversion is easily soluble in water, and after it has been dissolved the solution is treated with milk of lime. The lime salt of the sulpho-acid which is obtained by this process, and which is easily soluble in water, is separated by filtration from the gypsum, and by treating with a solution of soda it is transformed into the corresponding salt of soda, which latter is reduced to a dry state by evaporation. A surplus of alkali must be avoided, since by such decomposition ensues. The salt thus produced, however, is very deliquescent, and in order to render it convenient for commercial purposes I prefer to transform the same into an acid sodium salt, which has a metallic green appearance. For this purpose I add to the solution of the salt of soda a sufficient quantity of muriatic acid, until the mixture assumes a purple color, and then I dry the product by evaporation.

The proportions and temperatures above named admit of a wide range, and they depend in a great measure upon the degree of concentration of the sulphuric acid used. If anhydrous sulphuric acid is used, the reaction on methyl-violet takes place in a short time, and without requiring any external heat; but if fuming sulphuric acid is used, the reaction requires more time and external application of heat.

The characteristics of the new coloring-matter or dye-stuff prepared from methyl-violet in the manner above described are as follows: It produces nearly the same shades which are produced by the basic methyl-violet, from which it is derived; the sulpho-acid and its salts are soluble in water; by a surplus of alkali the solutions are decolorized; by strong acids the color produced by the sulpho-acid is only changed with great difficulty.

The dyeing is done principally in a boiling bath, with the additions of mineral or organic acids, alumina, or tin mordants, and with other mordants, such as are commonly used in dyeing or printing.

The sulpho-acid of methyl-violet, when produced in the form of a powder, has a bluish color, not dichroic.

What I claim as new, and desire to secure by Letters Patent, is—

As a new manufacture, a dye-stuff or coloring-matter having the characteristics above described, and produced from methyl-violet by means substantially such as herein set forth, or by any other means which will produce a like result.

In testimony that I claim the foregoing I have hereunto set my hand and seal this 22d day of February, 1878.

HEINRICH CARO. [L. S.]

Witnesses:
 WM. PICKHARDT,
 C. GLASER.